March 6, 1928. 1,661,970
F. L. SESSIONS
ELECTRIC WELDING MACHINE
Filed Jan. 13, 1923 4 Sheets-Sheet 2
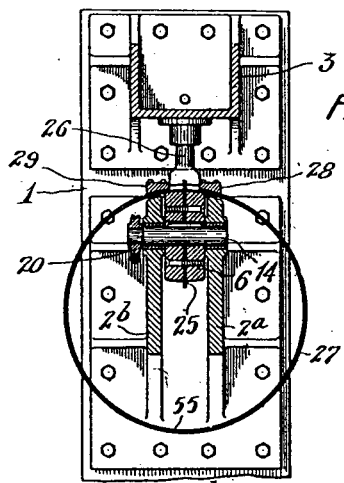
Fig. 7.
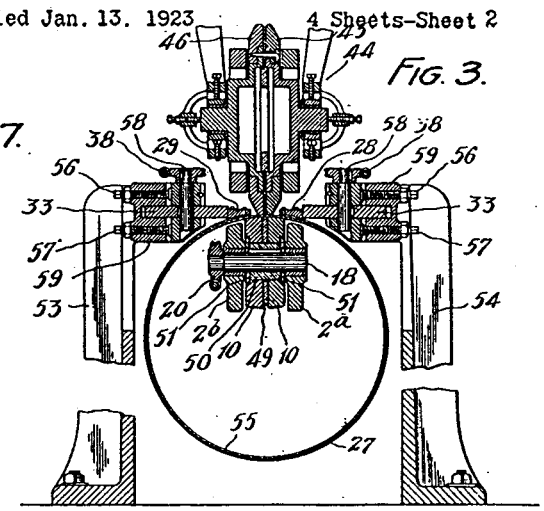
Fig. 3.
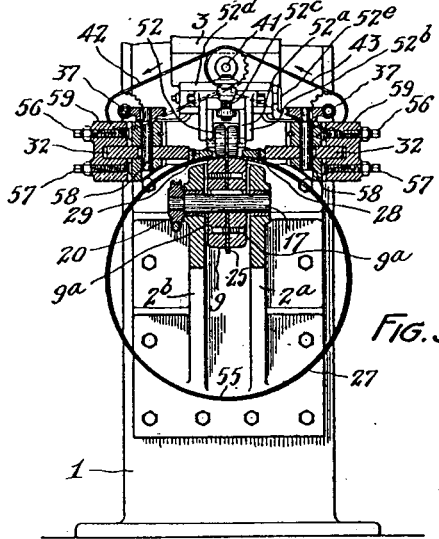
Fig. 5.
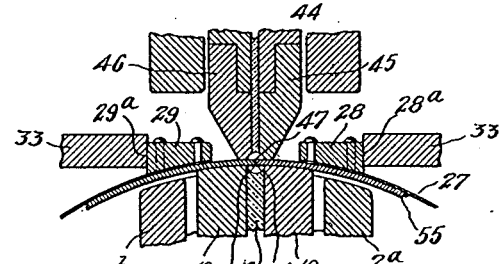
Fig. 4.
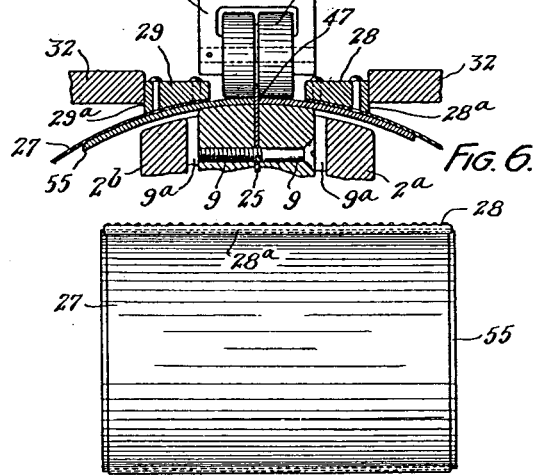
Fig. 6.
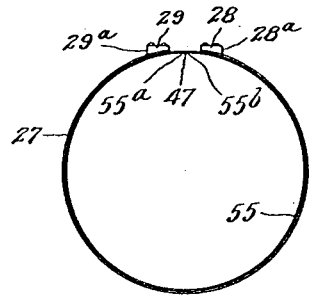
Fig. 14.
Fig. 15.
INVENTOR:
Frank L. Sessions March 6, 1928.                                                    1,661,970
F. L. SESSIONS
ELECTRIC WELDING MACHINE
Filed Jan. 13, 1923            4 Sheets-Sheet 3

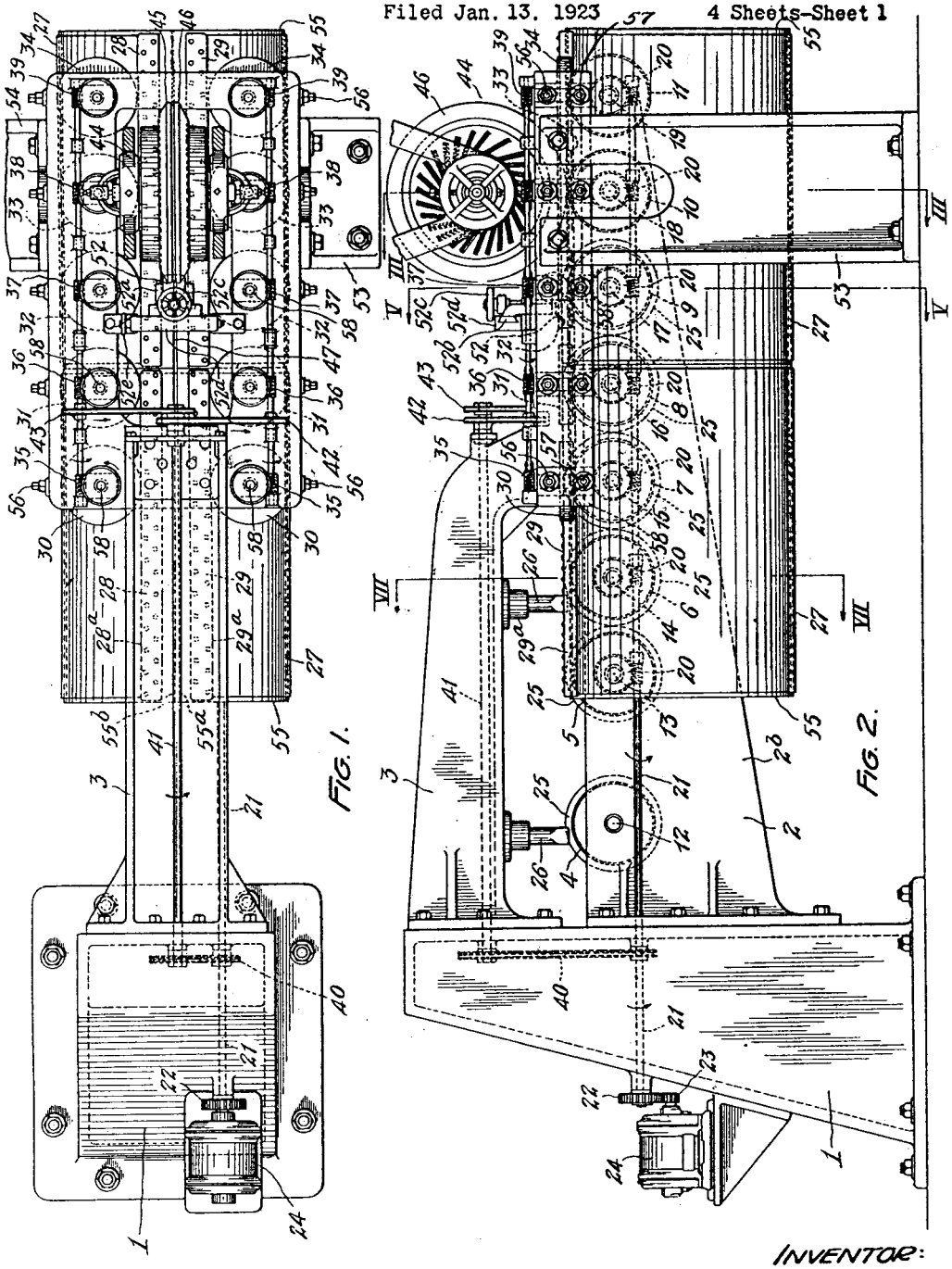

INVENTOR:
Frank L. Sessions

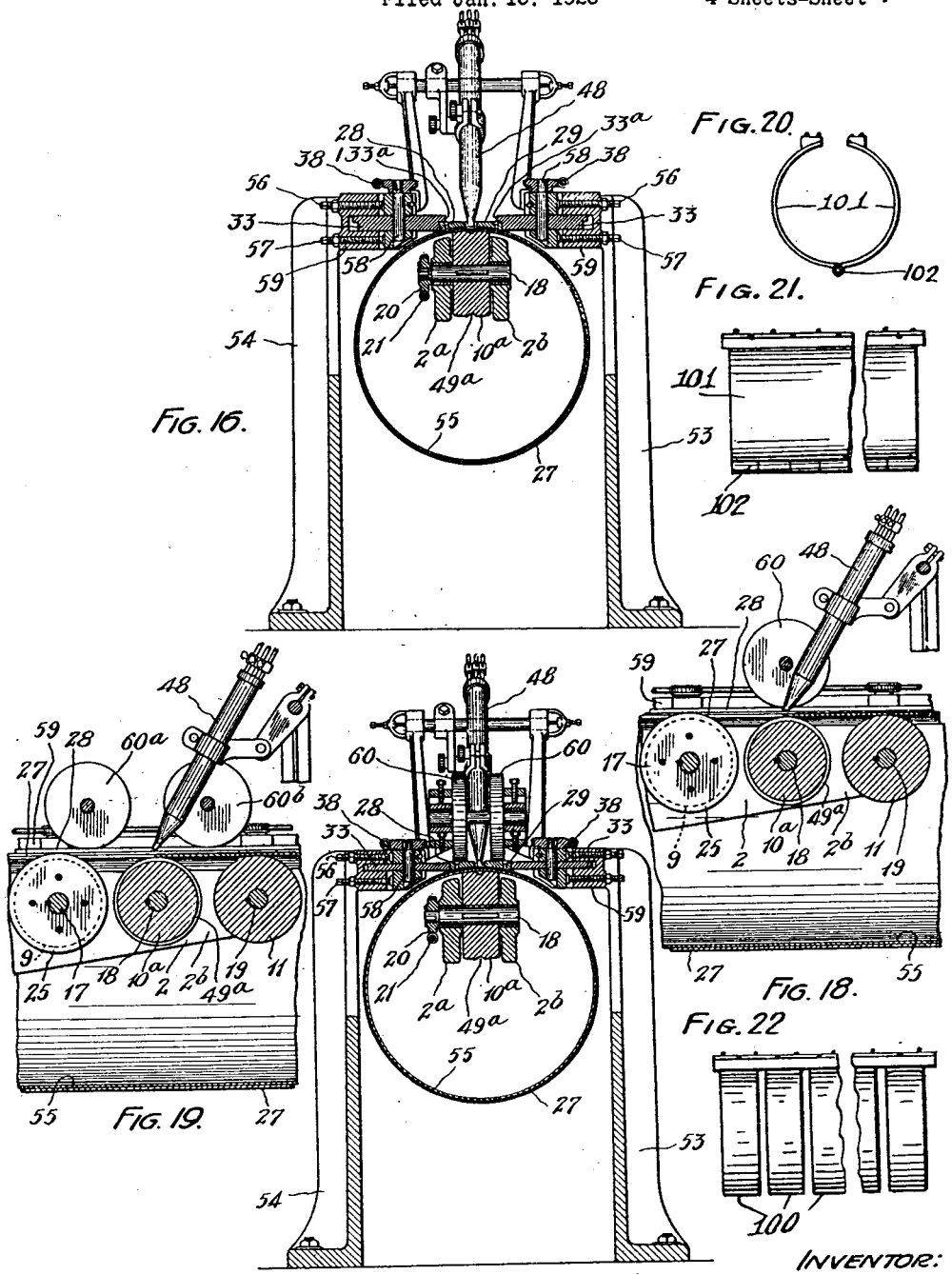

Patented Mar. 6, 1928.

1,661,970

UNITED STATES PATENT OFFICE.

FRANK L. SESSIONS, OF LAKEWOOD, OHIO.

ELECTRIC WELDING MACHINE.

Application filed January 13, 1923. Serial No. 612,436.

My invention has to do particularly with the welding of longitudinal seams in thin-wall, metal barrels, drums, receptacles or other elongated metal shells.

In the manufacture of such products the sheet metal used for the shell or body is rolled up into the proper form, generally cylindrical although my invention is also applicable to the welding of conical or other shape shells. The edges of the sheet which are to be welded together are generally sheared straight before the shell is rolled up so that they will abut evenly when they are clamped together for welding.

Heretofore it has been customary to apply clamps to the metal along each side of the seam to be welded and various means have been proposed and used for holding and pressing the seam edges together while the welding of the seam has been accomplished by hand-supported and hand-guided welding devices. Usually, the oxy-acetylene flame or the electric arc methods of welding have been employed in this work.

It is a fact within my personal knowledge that the welding of longitudinal seams of steel barrels is today accomplished very largely by hand-welding and, although a number of automatic machine welders for such articles have been proposed there are none of them, so far as I am aware, which are in successful commercial use today.

In order to successfully accomplish the welding together of the two abutting edges of a seam in thin sheet metal it is essential that certain conditions be maintained, especially as affecting the seam-cleft in its relation to the welding agents, the heat-supplying and seam-closing or pressure-exerting devices. This fact has been recognized by inventors in the art of welding thin-wall, metal tubing of ordinary commercial sizes ranging in thickness of wall from about .025 to .1 inch, and of diameters up to about three inches. Among these essential conditions are:—the accurate alignment of the edges of the seam cleft; the regular and constant speed of progression of the seam-cleft relative to the welding agent; the accurate guiding of the seam-cleft to cause it to follow a definite path through the welding zone so that both edges will be similarly heated; the pressing together of the contacting surfaces of the seam at the welding point and the maintenance of pressure until the weld has set; the accurate control of the temperature to which the metal is raised; and the proper correlation of speed of progression, heat supply and contact pressure.

In the welding of commercial tubing such as has been mentioned the edges of the tube bordering the seam-cleft can be readily held in accurate alignment and pressed together because of their inherent stiffness due to their cylindrical shape of small radius of curvature. For pressing the contacting surfaces together a pair of adjustable grooved rollers is generally employed, they being disposed upon opposite sides of the tube at the welding throat and adjusted towards and from each other for varying the welding pressure.

When, however, it comes to the welding of large diameter thin-wall shells or drums it is found that the walls of the tube adjacent the seam-cleft have comparatively little inherent stiffness and it is therefore difficult to hold them in alignment while they are approaching and passing through the welding throat. It has also been found that grooved, side-pressure rollers, such as are used for pressing the contacting surfaces of the seams of small tubes together are impractical for use with large diameters of shells, on account of their large size and weight and on account of the variation in size of the shells or drums which are to be welded. It has also been found difficult to prevent the walls of large shells from buckling and lapping along the seam-cleft, as they pass through the welding throat, thereby making an imperfect weld, or no weld at all, so that the product has to be scrapped.

For overcoming such difficulties as have been mentioned and to provide an apparatus in which large longitudinally butted-seam, metal shells or drums may be successfully welded I make use of a flexible or yielding clamp which is adapted to encompass the shell to be welded for the purpose of providing means for supporting, guiding, and exerting seam-closing pressure upon the shell during its passage through the welding machine. The flexible member may be provided with suitable stiffening ribs to coact with guide and pressure-exerting rollers, or other devices, and other provisions may be made for suitably supporting the work and for causing it to be progressively moved through the welding zone.

In other words, instead of attaching separate clamps to the shell along the abutting edges of the seam, or attempting to support the shell in massive, grooved rollers, I provide a simple jig or appliance adapted to support the shell and to be manipulated with it in its passage through the welding machine.

Some of the objects of my invention are: the provision of means for holding the abutting edges of the seam cleft of a thin metal shell in proper alignment with each other and for applying pressure to the seam as it is being welded; the provision of an apparatus in which the welding of relatively large diameter, thin-wall cylinders can be performed with substantially the same efficiency as that with which the welding of relatively small-diameter, thin-wall, steel tubing by oxy-acetylene or electric welding processes is now performed; the provision of a flexible band or clamp adapted to surround and form a means for supporting the shell and for applying pressure to the seam cleft during the welding operation; the provision of means for traversing the shell past the welding agent so that the seam may be progressively welded; the provision of a machine upon which the unwelded shells may be successively placed in abutting relation upon feed rollers, moved through the welding zone and delivered in welded condition; the provision of means for guiding the seam cleft and maintaining it in proper relation to the welding agent; and the provision of means for properly locating and aligning the flexible supporting band upon the shell to be welded. These and other objects are accomplished by the use of my invention described in the following specification and shown in the accompanying drawings in which—

Fig. 1 is a plan view of a machine embodying my invention;

Fig. 2 is a side elevation of the machine shown in Fig. 1;

Fig. 3 is a section on line III—III of Fig. 2;

Fig. 4 is an enlargement of a fragmentary portion of Fig. 3;

Fig. 5 is a section on line V—V of Fig. 2;

Fig. 6 is an enlargement of a fragmentary portion of Fig. 5;

Fig. 7 is a section on line VII—VII of Fig. 2;

Fig. 14 is an end elevation and

Fig. 15 is a side elevation of the clamp shown in Figs. 11, 12 and 13, applied to a shell in seam-closed position;

Fig. 16 is a view similar to Fig. 3 but showing a gas flame instead of electric-heating devices used as the welding agent;

Fig. 17 is a modification of the structure shown in Fig. 16;

Fig. 18 is a vertical longitudinal section of the structure shown in Fig. 17;

Fig. 19 is a modification of the structure shown in Fig. 18;

Figs. 20 and 21 are end and side views respectively, on a reduced scale, of one modification of the clamp; and Fig. 22 is a side view, on a reduced scale, of a further modification of the clamp.

Figure 8:
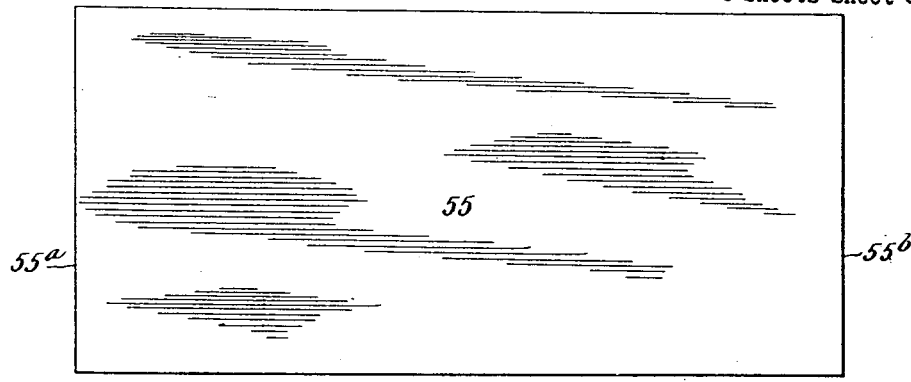
Fig. 8 is a plan view of a metal sheet from which a shell is to be made.

Referring to the drawings, 1 represents a pedestal forming the main support of a welding machine. An arm, 2, projects from a side of the pedestal and forms a support for the mechanism which feeds the shells past the welding means.

Above the arm, 2, and paralleling it is another arm, 3, which is also supported at one end by pedestal, 1, and projects from it. In order to better balance the arms, 2 and 3, the machine may be made with duplicate arms and mechanisms projecting from the opposite side of the pedestal, 1, in an obvious manner.

I prefer to divide the arm, 2, into two longitudinally extending rails, 2ª, 2ᵇ, which are spaced apart to accommodate vertical, supporting, feeding and guiding rolls 4, 5, 6, 7, 8 and 9, vertical, supporting, welding rolls, 10, and vertical, delivering rolls, 11. The rolls just mentioned are supported upon suitable shafts 12, 13, 14, 15, 16, 17, 18 and 19 respectively. I have shown the roll, 4, as not being power driven but the remainder of the vertical rolls mentioned are preferably driven by suitable means such as the worm drives, 20, which, as will be observed, are driven by shaft, 21, through suitable power transmitting connections such as the gears, 22, 23, from a motor, 24, or other source of power. Each of the rolls, 4 to 9, inclusive, is preferably provided with an annular fin, 25, best made of saw steel and located in the median plane of the roll. These fins are adapted to enter the seam between the abutting edges which are to be welded and to position and guide the seam cleft as the shell travels towards and through the welding throat. For the purpose of properly positioning the flexible clamp upon the shell I prefer to provide spacing members, 26, which may be secured to the arm, 3, or otherwise supported just above the receiving rolls, 4, 5 and 6.

The flexible clamp which I prefer to employ is shown in detail in Figs. 11 to 15, inclusive, and its position relative to the welding zone is best shown in Figs. 4 and 6. I prefer to make the clamp in the form of a band, 27, of light gauge steel and of a length somewhat less than the circumference of the shell which the band is to encompass, clamp and support during the welding operation. It will be understood however, that I do not limit the construction of the clamp to the form shown, as it is obvious that, for the sake of lightness, a series of spaced apart bands 100 may be employed as shown in Fig. 22 instead of the continuous width band such as that shown at 27. Or, the clamp may be merely two semi-circular, cylindrical members 101 hinged together or otherwise articulated as at 102, Figs. 20 and 21, to properly engage the shell which is to be welded. Along the abutting ends of the flexible band there are secured, preferably by riveting, transverse bars 28, 29, which serve to reinforce the edges of the band, distribute the pressure of the lateral-pressure rolls and form flanges or tracks, 28$^a$, 29$^a$, upon which the lateral-pressure rolls, 30, 31, 32, 33 and 34 press and roll along as the shell, encompassed by the band, 27, is traversed past the welding agent. It will be understood that while the bars, 28 and 29, extend transversely of the band, 27, such direction is parallel to the direction of movement of the shell through the welding machine.

The members of the pairs of lateral-pressure rolls, 30 to 34 inclusive, are disposed upon opposite sides of the seam of the shell to be welded, and upon opposite sides of the median plane of the vertical rolls, 4 to 11, inclusive, the axes of these lateral pressure rolls being preferably vertical or so disposed that their pressure upon the bars 28, 29, is transmitted to the edges of the seam cleft in a direction substantially tangent to the shell at the seam cleft and normal to the contacting surfaces which are to be welded.

It will be seen that the flexible clamp, 27, exerts a substantially uniform, circumferential pressure upon the shell during its passage through the machine, this pressure causing the edges of the seam cleft to firmly contact with each other and to be welded together by the welding heat which is preferably applied in or close to the plane of the axes of one of the pairs, 33, of lateral-pressure rolls.

The lateral-pressure rolls, 30 to 34, inclusive, are preferably power driven by suitable means such as the worm drives 35, 36, 37, 38 and 39 to which power may be transmitted from the motor, 24, by means of suitable connections such as the gears 22, 23, the shaft, 21, sprocket-chain drive, 40, shaft, 41, and sprocket-chain drives 42, 43.

The machine shown in Figs. 1 to 7 inclusive is equipped with an electrical resistance-welding device, conventionally shown at 44. It comprises a pair of electrodes, 45, 46, disposed in insulated relation to each other on opposite sides of the seam cleft, 47, and receiving current from a suitable source such as a welding transformer which may be adjustably supported in any suitable manner such as that shown in my co-pending application for tube welding machine Serial No. 590,884, filed September 27th, 1922, in which the electrodes are supported in bearings carried by the transformer and the weight of the transformer is utilized to press the electrodes into contact with the work.

Instead of an electric welding device a gas torch such as the oxy-acetylene torch, 48, shown in Fig. 16 may be employed for welding the seam. If a gas flame instead of electric current be used for heating the metal at the seam cleft suitable provision may be made for holding down the edges of the shell adjacent to the point where the welding flame impinges upon the metal. For this purpose the rolls, 133, instead of being plain faced as shown in Figs. 3 and 4 may have annular shoulders adapted to engage and hold down the upper edges of the bars, 28, 29, as shown at 133$^a$, Fig. 16. It will be noted that, in Fig. 16 where gas welding is illustrated, the bars, 28 and 29, are closer together than they are in Figs. 3, 4 and 6. This is for the purpose of holding the edges of the seam cleft in accurate alignment at the welding point. When the electrical resistance method of welding is used the electrodes, 45 and 46, bear downwardly upon the edges of the shell upon opposite sides of the seam cleft and no other means for holding down the shell edges is required. Supplemental vertical pressure rolls such as those shown at 60 in Fig. 17 may be employed when the welding agent is a gas flame or the electric arc.

For supporting the edges of the shell adjacent the seam cleft when electric welding is employed, the roll, 10, is preferably made in two parts insulated from each other and from their support. This may be accomplished by means of an insulating disc such as that shown at 49 (Figs. 3 and 4), for insulating the rolls from each other, and the insulating bushing, 50, and insulating washers, 51, for insulating the roll, 10, from the frame of the machine.

Instead of using a two-part metal roll, 10, with insulation, 49, between the parts, a roller support, 10$^a$, of suitable insulating material may be used and the disc, 49, be dispensed with. It will be understood that when an igneous flame is employed as the welding agent the support, 10$^a$, may be of metal. It may be of metal also if arc welding be employed. But, whatever the material rolls, 10 or 10$^a$, be made of, and whatever the heating means for effecting the weld, it is preferable to provide an annular groove 49$^a$ in the surface of such rolls to permit the weld burr, if any there be, to extend into it without striking the supporting rolls.

For preventing the distortion, buckling or lapping from expansion due to heat of the edges of the seam cleft as they approach the welding zone a top pressure roll, 52, may be adjustably mounted above the roll, 9. The roll, 52, is preferably provided with a circumferential slot adapted to receive the annular fin, 25, of roll, 9. The roll, 9, is preferably mounted to have lateral play between the supports, 2$^a$ and 2$^b$, spaces, 9$^a$ (Fig. 5) being provided to permit such lateral play.

The slotted roll, 52, is preferably adjustable both vertically and laterally, the vertical adjustments being provided for the purpose of properly positioning the roll 52, to suitably engage different thicknesses of metal being welded, and the lateral adjustments being provided for the purpose of properly positioning the seam cleft to cause it always to pass through the welding zone centrally between the electrodes if electric resistance-welding be employed, or in proper alignment with the welding flame or arc, respectively if gas or electric-arc-welding be employed. The roll, 52, is supported in a bracket, 52$^a$, which is vertically adjustable in a guide block, 52$^b$, by means of a screw and hand wheel, 52$^c$. The guide block 52$^b$, is laterally adjustable in a sliding guide in a stationary support, 52$^d$, by means of a screw and hand wheel, 52$^e$. It will be seen that both vertical and lateral adjustments of roll, 52, may be effected by the mechanism described. If desired the guiding fin may be omitted from roll, 9, and a similar fin be incorporated in roll, 52. In such case a slot should be provided in roll, 9, to receive the fin of roll, 52. It is obvious that means other than that herein shown and described may be employed for guiding the seam of the shell as it approaches the welding point and I do not limit my invention to the use of any particular form of seam guide.

For supporting the outer end of the arm, 3, suitable floor posts or pedestals, 53, 54, may be employed.

Figure 10:
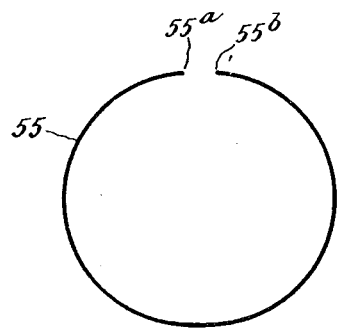
Fig. 10 is an end view of the unwelded shell shown in Fig. 9.
Figure 9:
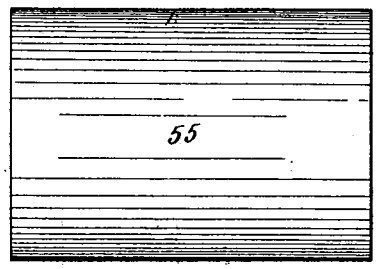
Fig. 9 is a side elevation of a formed but unwelded shell.
Figure 11:
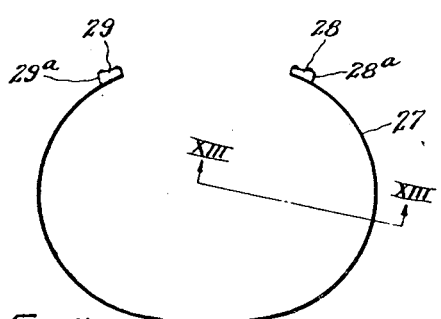
Fig. 11 is an end view of the flexible clamp opened for receiving such a shell as that shown in Figs. 9 and 10.
Figure 12:
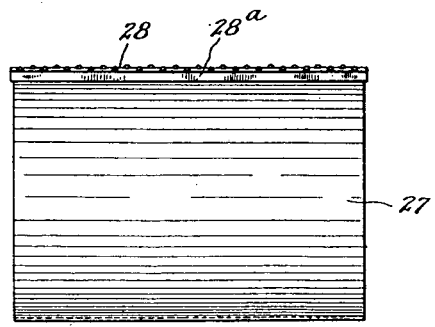
Fig. 12 is a side elevation of the device shown in Fig. 11.
Figure 13:
Fig. 13 is a section on line XIII—XIII of Fig. 11.

In Fig. 8 there is shown a plan view of a sheet, 55, from which the shell to be welded may be formed. It will be understood that the edges of this sheet should be properly squared up and that the sheet should be of suitable length to form the desired girth of the welded drum including the necessary allowance for take-up in the weld. In Figs. 9 and 10 the sheet, 55, is shown after it has been rolled into a cylindrical, open-seam shell, the edges, 55$^a$, 55$^b$, being shown slightly spaced apart but in abutting relation.

It will be understood that the clamp, 27, should be of suitable length or circumference to properly encompass the shell, and, when passed between the lateral-pressure rolls, 30, 31, 32, 33 and 34, to exert proper pressure upon the seam cleft. The lateral pressure rolls are preferably made adjustable by suitable means such as the screws, 56, 57. The shafts, 58, of the lateral-pressure rolls may be supported in bearings adjustably mounted in the side frames, 59, which may be secured to or form part of the arm, 3. By manipulating the screws 56, 57, the lateral pressure rolls may be made to exert the desired pressure upon bars, 28, 29, to guide the shell and press the seam cleft together at the welding point.

The operation of my invention is as follows:

A metal shell such as that shown in Figs. 9 and 10 is slipped into a flexible clamp 27, the opposite edges of the shell being placed so as to roughly parallel the bars, 28, 29, respectively, and to extend equal distances therefrom. The shell and band are then sprung open about as the band is shown to be sprung in Fig. 11, and together they are lifted vertically up from beneath arm, 2, and the edges of the shell, and the bars, 28, 29, of the band are made to engage the fins, 25, of rolls 4 and 5, and the spacing members, 26, respectively. The shell with the encompassing band is then pushed toward the welding throat until the shoulders 28$^a$, 29$^a$, are engaged by the first pair, 30, of lateral-pressure rolls when it is seized by them and propelled toward the welding throat. As it travels along it is successively engaged by the pairs of rolls, 31, 32, 33, and 34, guided by the fins, 25, of the vertical rolls, 6, 7, 8 and 9 and finally after the seam is welded it is delivered by vertical rolls, 11 and lateral rolls, 34. It will be understood that separate shells encompassed by separate flexible bands may be successively placed upon the machine so that the leading end of each shell abuts against the trailing end of the preceding shell, the seam clefts being welded in continuous succession as though they were all formed in one piece. For such a continuous succession of shells, the clamps, 27, should be made slightly narrower than the shells as shown in Fig. 15.

Among the advantages of my invention are increased output, saving of factory space, and standardized and superior quality of weld. In addition to these advantages my invention effects a very considerable saving in the cost of welding thin-wall shells particularly as it provides means for utilizing the electrical-resistance method of welding in the making of such shells of relatively large diameter, which method is the most economical method of seam-welding at present known.

I claim:

1. In apparatus for welding the contacting surfaces of a longitudinal, open seam in a metal shell, a freely suspended detachable yielding clamp adapted to encompass the shell, said clamp being shorter in length than the circumference of said shell to provide a space between the ends of the clamp, said clamp provided with stiffening flanges substantially the width of the clamp and being adapted to co-act with lateral-pressure devices for causing said clamp to exert circumferential pressure upon the encompassed shell.

2. In apparatus of the class described, a freely suspended detachable yielding clamp adapted to encompass a metal shell, a seam-welding device, and means for causing a metal shell, encompassed by said clamp, to progressively traverse the welding zone of said seam-welding device.

3. In apparatus of the class described, a freely suspended detachable yielding clamp adapted to encompass a butted-seam, metal shell, a seam-welding device, and means for causing progressive, relative movement of such a shell, encompassed by said clamp, and said seam-welding device, whereby the seam of said shell is progressively subjected to the welding action of said seam-welding device.

4. In apparatus of the class described, a yielding clamp adapted to encompass a metal shell, said clamp having a transverse flange upon each of its ends, a seam-welding device, means for supporting and progressively traversing an open-seam, metal shell, encompassed by said clamp, through the welding zone of said seam-welding device, and means adapted to engage said flanges and exert pressure thereon to cause said clamp to circumferentially compress said shell and press the abutting seam surfaces thereof together.

5. In apparatus of the class described, a yielding clamp adapted to encompass a metal shell, said clamp being shorter in circumference than the circumference of said shell to provide a space betwen the ends of the clamp, said clamp having a transverse flange upon each of its ends adapted to form a track for and co-act with lateral-pressure rolls for causing said clamp to exert circumferential pressure upon the encompassed shell.

6. In apparatus of the class described, a yielding clamp adapted to encompass a metal shell, said clamp being shorter in circumference than the circumference of said shell to provide a space between the ends of the clamp, said clamp having a transverse flange upon each of its ends adapted to form a track for and co-act with lateral-pressure rolls for causing said clamp to exert circumferential pressure upon the encompassed shell, a pair of oppositely-disposed, lateral-pressure rolls adapted to roll along said flanges, and means for progressively traversing said shell encompassed by said clamp in a straight line past said lateral-pressure rolls, one of said rolls being in contact with one and the other in contact with the other of said flanges.

7. In apparatus of the class described, a yielding clamp adapted to encompass a metal shell, said clamp being shorter in circumference than the circumference of said shell to provide a space between the ends of the clamp, said clamp having a transverse flange upon each of its ends adapted to form a track for and co-act with lateral-pressure rolls for causing said clamp to exert circumferential pressure upon the encompassed shell, a pair of oppositely-disposed, lateral-pressure rolls adapted to roll along said flanges, means for progressively traversing said shell, encompassed by said clamp, in a straight line past said lateral-pressure rolls, one of said rolls being in contact with one and the other in contact with the other of said flanges, and heating means adapted to heat a line of the metal of said shell in said space to a welding temperature as the shell and its clamp are so traversed.

8. In a machine for welding metal barrels, a support, a plurality of aligned vertical rolls carried by shafts supported on said support means for driving some of said rolls, a second support above said first named support, a plurality of horizontal rolls mounted upon shafts carried by said second support, said horizontal rolls being arranged in pairs, the members of a pair being disposed upon opposite sides of the median vertical plane of said vertical rolls, spacing members supported above said vertical rolls in said vertical plane, said vertical and horizontal rolls being disposed in two series in planes transverse to each other, a welding agent disposed near the end of said series of rolls, a flexible clamp adapted to encompass a shell to be welded, said clamp being adapted to be placed upon said vertical rolls with its ends abutting said spacing members, to be traversed along the tops of said vertical rolls, held in alignment thereby and by said horizontal rolls, and caused to pass said welding agent.

9. In a machine of the class described a cantalever support, vertical rolls carried by said support, said rolls being provided with annular fins, said fins being disposed in alignment with each other, a plurality of horizontal rolls above said vertical rolls disposed in pairs, the members of a pair being disposed upon opposite sides of said fins, a welding agent in the plane of said fins, clamping means adapted to support and guide a shell to be welded, said clamp being adapted to move upon the tops of said vertical rolls and be guided by said horizontal rolls past said welding agent.

10. In a welding machine of the class described, a cantalever support, a plurality of rollers carried thereon having their axes transverse to said support and their peripheries extending above the surface of said support, a plurality of guide rolls supported upon vertical axes above said support, said guide rolls being arranged in pairs, the members of a pair being disposed upon opposite sides of the median vertical plane of said rollers, a flexible, shell-supporting clamp, said rollers being adapted to engage said clamp as it is caused to move longitudinally of said support supported upon said rollers.

11. In apparatus of the class described, a flexible clamp adapted to encompass a butted-seam, metal shell, means for supporting and imparting progressive movement to such a shell, encompassed by said clamp, said movement being parallel to said butted-seam, means engaging said clamp adapted to exert pressure thereon to circumferentially compress said shell and press the abutting seam-surfaces thereof together, and heating means in the path of movement of said seam adapted to heat said abutting seam-surfaces thereof to a welded temperature, whereby they are welded together.

12. In apparatus of the class described, a flexible clamp adapted to encompass a metal shell, said clamp having a transverse flange upon each of its ends, an overhanging support adapted to be encompassed by a metal shell and said clamp, a vertical roll carried by said support and having its periphery projecting above the support to form a roller bearing for said shell, a pair of oppositely disposed transverse rolls supported above said support and adapted to engage said flanges, means for causing the shell encompassed by said clamp to progressively move along upon said vertical roll, said flanges respectively engaging said transverse rolls, and heating means disposed to heat the metal of said shell between said flanges to a welding temperature as the shell is progressively moved past said heating means.

13. In apparatus of the class described, a flexible clamp adapted to encompass a metal shell, said clamp having a transverse flange upon each of its ends, an overhanging support adapted to be encompassed by a metal shell and said clamp, a vertical roll carried by said support and having its periphery projecting above the support to form a roller bearing for said shell, a pair of oppositely disposed transverse rolls supported above said support and adapted to engage said flanges, means for causing the shell encompassed by said clamp to progressively move along upon said vertical roll, said flanges respectively engaging said transverse rolls, heating means disposed to heat the metal of said shell between said flanges to a welding temperature as the shell is progressively moved past said heating means, and means for varying the distance between said transverse rolls.

14. In apparatus of the class described, an overhanging horizontal support provided with vertical rolls along its upper surface said support and rolls adapted to be encompassed by and support an elongated metal shell, a flexible clamp adapted to encompass such a metal shell said clamp being shorter in circumference than the circumference of said shell to provide a space between the ends of the clamp, said clamp being adapted to co-act with lateral pressure devices for causing said clamp to exert circumferential pressure upon the encompassed shell, means for causing progressive movement of said shell and said clamp between said lateral pressure devices and along said support, and heating means adapted to heat the metal of said shell between the ends of said clamp to a welding temperature.

15. In apparatus of the class described, means for supporting a shell having a longitudinal, open seam and for causing it to progressively move in a direction parallel to said seam, circumferentially yielding means adapted to encompass the shell and expose the seam thereof as it is so supported and moved, means co-acting with said yielding means to cause it to exert circumferential pressure upon the shell to press the abutting seam-surfaces thereof together, and heating means in the path of movement of said seam adapted to heat said abutting seam-surfaces to a welding temperature whereby they are welded together.

16. In apparatus of the class described, means for supporting a shell having a longitudinal, open seam and for causing it to progressively move in a direction parallel to said seam, circumferentially yielding means adapted to encompass the shell and expose the seam thereof as it is so supported and moved, means co-acting with said yielding means to cause it to exert circumferential pressure upon the shell to press the abutting seam-surfaces thereof together, heating means in the path of movement of said seam adapted to heat said abutting seam-surfaces to a welding temperature whereby they are welded together, and a seam guide between said abutting seam surfaces at a point in advance of said heating means.

17. In apparatus of the class described, a series of aligned, vertical rolls provided with annular fins, said rolls being mounted in bearings in an elongated support adapted to be encompassed by an open-seam shell disposed with its abutting seam-surfaces separated by said fins, a yielding clamp adapted to encompass said shell and expose the seam thereof, means co-acting with said clamp to cause said clamp to exert circumferential pressure upon said shell to close the seam thereof, heating means adapted to heat the abutting surfaces of said seam to a welding temperature, and means for causing progressive relative movement of said shell and said heating means longitudinally of said seam.

18. In apparatus of the class described, a series of aligned, vertical rolls one of them being provided with an annular fin, said rolls being mounted in bearings in an elongated support adapted to be encompassed by an open-seam shell disposed with its inner seam-edges resting on said rolls and its abutting seam-surfaces separated by said fin, a yielding clamp adapted to encompass said shell and expose the seam thereof, lateral-pressure means co-acting with said clamp to cause it to exert circumferential pressure upon said shell to close the seam thereof, heating means adapted to heat the abutting surfaces of said seam to a welding temperature, and means for causing progressive, relative movement of said shell and said heating means longitudinally of said seam, said heating means being located in relation to said movement at a point behind said fin, said lateral-pressure means and said clamp being adapted to cause the abutting surfaces of said seam to be pressed together with welding pressure while at welding temperature.

19. In apparatus of the class described, means for supporting a shell having a longitudinal open seam, circumferentially yielding means adapted to encompass the shell and expose the seam thereof, heating means adapted to heat the abutting seam-surfaces of said seam to a welding temperature, means for causing progressive, relative movement, parallel to said seam, of said shell, encompassed by said yielding means, and said heating means, and means co-acting with said yielding means to cause it to exert circumferential pressure upon the shell to press the abutting seam-surfaces thereof together during said progressive movement whereby they are progressively welded.

20. In apparatus of the class described, means for supporting a shell having a longitudinal open seam, circumferentially yielding means adapted to engage the shell and expose the seam thereof as it is so supported, means coacting with said yielding means to cause it to exert pressure upon the shell to press the abutting seam surfaces thereof together, heating means, means to cause relative longitudinal movement between the yielding means and the heating means, said heating means arranged to heat said abutting seam surfaces during said movement to a welding temperature and thereby weld said seam.

21. In apparatus of the class described, an overhanging support adapted to be loosely encompassed by and support an elongated metal shell having a longitudinal seam, means for pressing the abutting edges of said seam together, welding means adjacent to said shell adapted to apply welding heat to the metal thereof along said seam, and means for causing relative progressive traversing movement between said shell and said welding means to cause said seam to be progressively welded.

22. In apparatus of the class described, an overhanging support adapted to be loosely encompassed by and support an elongated metal shell having a longitudinal seam, means adjustable circumferentially to engage said shell while exposing said seam, means cooperating with the circumferential engaging means for pressing the abutting edges of said seam together, welding means adjacent to said shell adapted to apply welding heat to the metal thereof along said seam, and means for causing relative progressive traversing movement between said shell and said welding means to cause said seam to be progressively welded.

23. In apparatus for progressively butt welding the contacting surfaces of a longitudinal open seam in a metal shell, a yielding clamp adapted to substantially encompass the shell, said clamp having a transverse flange upon each of its ends, and means for progressively exerting pressure upon said flanges to progressively force the surfaces of the seam-cleft of the shell together.

24. In apparatus for progressively butt welding the contacting surfaces of a longitudinal open seam in a metal shell, a yielding clamp adapted to substantialy encompass the shell, means for contracting said clamp about said shell to cause the abutting contacting surfaces of the seam-cleft to be pressed together, welding means adapted to heat the contacting surfaces of the seam-cleft in a narrow zone to welding temperature, and means for causing relative traversing movement longitudinally of the welding means and said clamp and of the seam of said shell whereby said seam is progressively heated and welded.

25. In apparatus for progressively butt welding a longitudinal seam in a metal shell, an elongated support adapted to be loosely encompassed by and to support the shell suspended thereon and contacting therewith upon opposite sides of the seam-cleft of said shell, means for pressing the abutting surfaces of the seam-cleft together, heating means adapted to heat a short length of said abutting surfaces to a welding temperature and means for causing progressive, relative traversing movement of said shell and said welding means to cause said seam to be progressively welded.

26. In apparatus of the class described, means for supporting a shell having a longitudinal butted seam, circumferentially yielding means adapted to encompass the shell and expose the seam thereof as it is so supported, means co-acting with said yielding means to cause it to exert circumferential pressure upon the shell to press the abutting seam-surfaces together, heating means adapted to heat a narrow area of said abutting seam-surfaces to a welding temperature and means for causing progressive relative traversing movement of said shell and said heating means to cause said seam to be progressively welded.

27. In apparatus for progressively, electrically welding the contacting surfaces of a longitudinal, butted seam in a metal shell by the electrical resistance method, an elongated support adapted to be loosely encompassed by and to support the shell suspended thereon and contacting therewith upon opposite sides of the seam-cleft of said shell and closely adjacent thereto, means for pressing the abutting surfaces of the seam-cleft together, an electric welding circuit including electrodes adapted to contact with the metal of said shell upon opposite sides of the seam-cleft respectively and closely adjacent thereto whereby the pressure of the electrodes upon the shell is transmitted to and supported by said elongated support and means for causing progressive, relative traversing movement of said shell and said electrodes to cause said seam to be progressively welded.

28. In apparatus for butt-welding the edges of a shell comprising an independent and detachable, yielding, shell-engaging and enveloping means having reinforced edges and adapted to support said shell and expose the shell edges to be welded, pressure applying means adapted to engage said reinforced edges to press the shell edges into butt contact, heating means adapted to heat a narrow area of the contacting edges of the shell to a welding temperature, and means for causing progressive relative traversing movement of said shell and said heating means to cause the contacting edges of said shell to be progressively welded together.

29. In apparatus of the class described, means for supporting a shell having a longitudinal butted seam, circumferentially yielding means adapted to encompass the shell and expose the seam thereof as it is so supported, means co-acting with the said yielding means to cause circumferential pressure to be applied to the shell to press the abutted seam surfaces together, heating means adapted to heat a narrow area of said abutting surfaces to a welding temperature, and means for causing progressive relative traversing movement of said shell and said heating means to cause said seam to be progressively welded, said yielding means being adapted to prevent the welded joint from separating.

30. In apparatus of the class described, a non-attached yielding clamp adapted to encompass a metal shell, a seam-welding device, means for supporting and progressively traversing a metal shell encompassed by said clamp through the welding zone of said seam-welding device, and means adapted to engage said clamp and exert pressure thereon to cause said clamp to circumferentially compress said shell and press the seam surfaces thereof together.

31. In an apparatus of the class described, a non-attached clamp adapted to encompass a metal shell and of outer dimensions substantially the width of the shell, said clamp being shorter in circumference than the circumference of said shell to thereby provide a space between the ends of the clamp so as to expose the shell to the action of a welding means.

32. In an apparatus of the class described, a freely suspendable non-attached clamp adapted to encompass a metal shell, said clamp having a circumference shorter than the shell to be encompassed, and transverse flanges thereon extending substantially the width of the clamp.

33. In apparatus for progressively electrically butt-welding the contacting surfaces of a butted seam in sheet metal, a detachable encompassing clamp, means for supporting said sheet metal and clamp upon opposite sides of the seam-cleft closely adjacent thereto, electrodes disposed above and separated from said supporting means and adapted to contact with the sheet metal plates upon opposite sides of the seam-cleft and closely adjacent thereto and substantially in the vertical planes of contact of the sheet metal work with said supporting means, means for guiding and traversing said sheet metal work and clamp past said supporting means and said electrodes longitudinally of the seam-cleft, means for causing the electrodes to press firmly upon the work, means for pressing the abutting surfaces of the seam-cleft firmly together, and an electric circuit including said electrodes whereby electric current is caused to flow across said seam-cleft between said electrodes and progressively weld said seam-cleft.

In testimony whereof, I affix my signature.

FRANK L. SESSIONS.